L. J. F. ROONEY.
EXPANSION PIPE SLEEVE.
APPLICATION FILED MAR. 30, 1918.
1,292,072.
Patented Jan. 21, 1919.
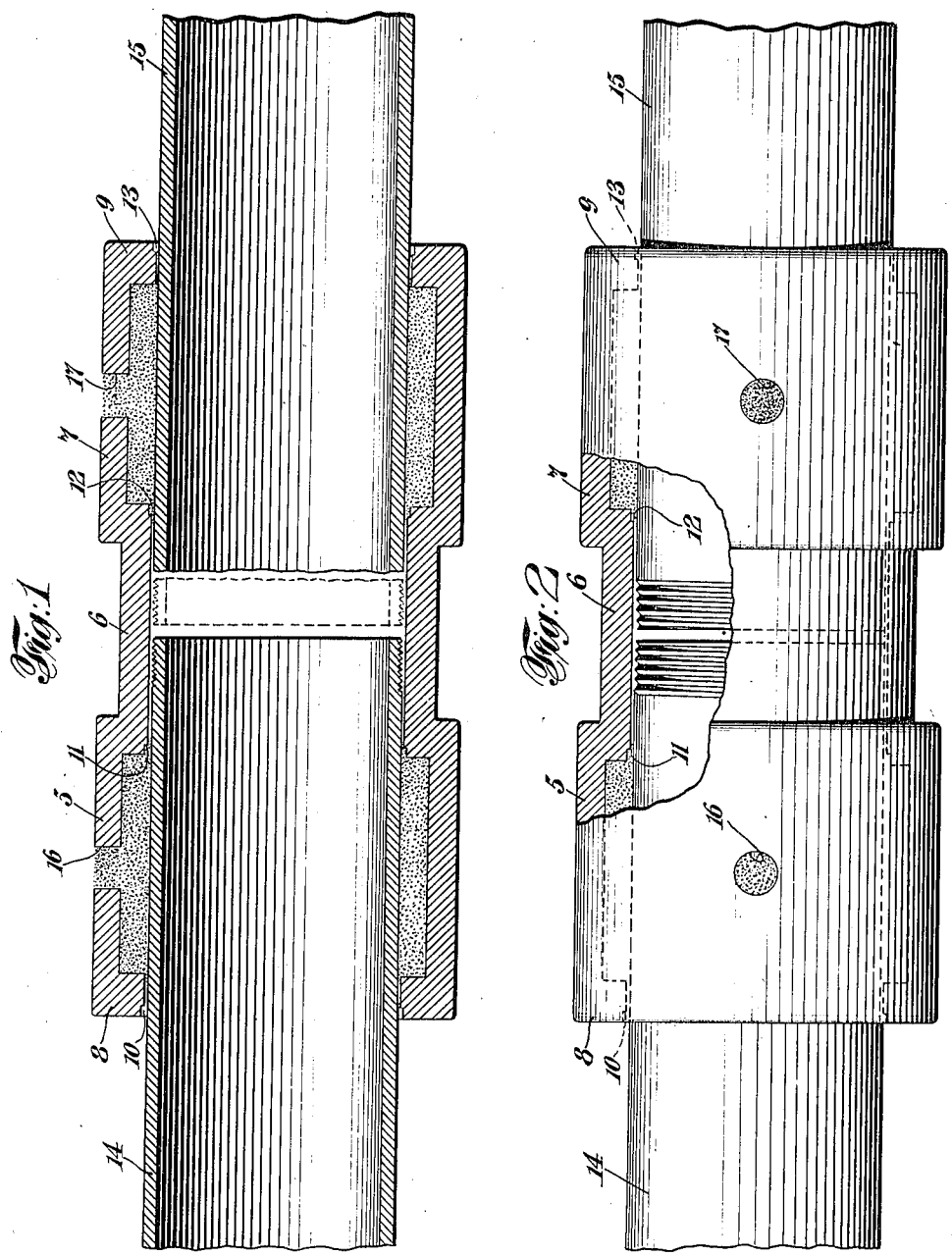
INVENTOR
Leo J. F. Rooney
BY
Horace Freeman
his ATTORNEY

UNITED STATES PATENT OFFICE.

LEO J. F. ROONEY, OF TULSA, OKLAHOMA.

EXPANSION-PIPE SLEEVE.

1,292,072. Specification of Letters Patent. Patented Jan. 21, 1919.

Application filed March 30, 1918. Serial No. 225,639.

*To all whom it may concern:*

Be it known that I, LEO J. F. ROONEY, a citizen of the United States, and a resident of Tulsa, in the county of Tulsa and State of Oklahoma, have invented certain new and useful Improvements in Expansion-Pipe Sleeves, of which the following is a full, clear, and exact specification.

The device of my invention relates to expansion pipe sleeves and refers particularly to such devices in which a molten material is employed as the sealing medium.

One object of my invention is a device whereby broken pipe lines may be readily and effectively repaired.

Another object of my invention is a device whereby a pipe line may be prevented from breakage due to expansion and contraction.

Another object of my invention is a device whereby two pipes may be readily and effectively joined together.

Another object of my invention is a device whereby two pipes may be readily and effectively joined together allowing a lateral movement of the pipes without breaking the joint.

These and other objects of my invention will be evident upon a consideration of my specification and drawings.

The breakage of pipe joints in pipe lines is of frequent occurrence, especially when the lines are of considerable length. This breakage is due to a number of causes among which are the expansion and contraction of the pipes due to changes of temperature, rusting of the pipes and couplings and the impact of heavy bodies.

The repair of such breakages by replacing the broken pipe lengths is expensive, as it causes a wastage of pipe, necessitates the transportation of long lengths of pipe, the employment of considerable expert labor and the loss of time.

The device of my invention overcomes these difficulties and presents a means whereby such breaks may not only be easily, effectively and economically repaired with common labor, but also, whereby they may in large part be prevented. It may also be slipped over a "split" in a joint of pipe.

My invention, in a broad way, comprises a chambered sleeve which may be readily slipped over the ends of the two pipes, the chambers being then filled with a material which will form a tight joint with the pipes and allow of a sufficient longitudinal movement of the pipes to prevent breakage due to expansion or contraction.

It is evident that the usefulness of my device is not limited to repairing broken pipes but that such breaks may be largely prevented, if it is installed in the original pipe lines at such distances as to take care of the expansion and contraction to which the pipe line is subjected.

In the drawings accompanying this specification and illustrating one form of the device of my invention, similar parts are designated by similar numerals.

Figure 1 is a vertical cross-section showing my device employed for forming a jointure between broken pipes.

Fig. 2 is a plan view, partly in section, showing my device employed for forming a jointure between two unbroken pipes.

The particular form of the device of my invention, as shown in the accompanying drawings, is of a tubular construction comprising the integral parts 5, 6 and 7. The parts 5 and 7 are of slightly greater diameter than the part 6. The part 5 has an inwardly extended annular part 8, and the part 7 has an inwardly extended annular part 9. The diameters of parts 8, 6 and 9 are approximately the same. The parts 8, 6 and 9 have the annular grooves 10, 11, 12 and 13 respectively to allow of the more easy insertion of the pipes 14 and 15. The parts 5 and 7 have the pour holes 16 and 17 respectively.

The operation of the device is as follows:—

The pipe 15 is raised a little out of the ditch, the device of my invention is slipped over pipe 14, pipe 15 is dropped into the ditch and the device slipped back over the pipe 15 until it is approximately equally over the two pipes 14 and 15. Molten lead, or other suitable material, is then poured through the pour holes 16 and 17, filling the chambers within the parts 5 and 7 and allowed to cool, thus forming a tight expansion sleeve connecting the pipes 14 and 15.

It is evident that the diameters of 8, 6 and 9 should be of such a dimension as to allow of as tight a joint as possible with the pipes 14 and 15, while allowing the device to be slidably movable over the pipes 14 and 15, and the diameter of the parts 5 and 7 should be sufficiently great as to contain sufficient lead to form an absolutely tight joint with the pipes 14 and 15.

I do not limit myself to the particular size, shape, number or arrangement of parts, nor to the particular sealing medium described and shown, all of which may be varied without going beyond the scope of my invention as described and claimed.

What I claim is:—

1. A pipe coupling having a centrally situated annular wall adjustable upon an inserted unthreaded pipe, an annular wall at each end adjustable upon an inserted unthreaded pipe, an unthreaded chamber between each end wall and the central wall and means whereby a molten metal may be poured into the chambers when the device is in horizontal position allowing the chambers to be filled with the metal.

2. A pipe coupling having a centrally situated annular wall adjustable upon an inserted unthreaded pipe, an annular wall at each end adjustable upon an inserted unthreaded pipe, an unthreaded chamber between each end wall and the central wall, and an opening into each chamber between the end wall and the central wall through which a molten metal may be poured.

3. A pipe coupling having a centrally situated annular wall adjustable upon an inserted unthreaded pipe, an annular wall at each end adjustable upon an inserted unthreaded pipe, an unthreaded chamber between each end wall and the central wall and an opening within each chamber through which a molten metal may be poured downwardly upon a horizontally positioned unthreaded pipe and said metal being maintained within the chamber.

Signed at Tulsa, in the county of Tulsa and State of Oklahoma, this 26th day of March, 1918.

LEO J. F. ROONEY.